(12) United States Patent
Lin

(10) Patent No.: US 11,300,864 B2
(45) Date of Patent: Apr. 12, 2022

(54) PROJECTOR AND WHEEL-TYPE OPTICAL ASSEMBLY

(71) Applicant: Coretronic Corporation, Hsin-Chu (TW)

(72) Inventor: Po-Hung Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/065,532

(22) Filed: Oct. 8, 2020

(65) Prior Publication Data

US 2021/0116796 A1     Apr. 22, 2021

Related U.S. Application Data

(60) Provisional application No. 62/915,650, filed on Oct. 16, 2019.

(30) Foreign Application Priority Data

Jul. 10, 2020  (CN) .......................... 202021345744.4

(51) Int. Cl.
  *G03B 21/20*   (2006.01)
  *G02B 26/00*   (2006.01)
(52) U.S. Cl.
  CPC ......... *G03B 21/204* (2013.01); *G02B 26/008* (2013.01); *G03B 21/208* (2013.01)
(58) Field of Classification Search
  None
  See application file for complete search history.

(56) References Cited

U.S. PATENT DOCUMENTS

2002/0140910 A1*  10/2002  Stark ................... H04N 9/3114
                                                     353/84

FOREIGN PATENT DOCUMENTS

| CN | 103375774  | A | * | 10/2013 |  |
| CN | 103375774  |   |   | 4/2015  |  |
| CN | 109254487  | A | * | 1/2019  | ............. G03B 21/14 |

* cited by examiner

*Primary Examiner* — Michelle M Iacoletti
*Assistant Examiner* — Danell L Owens
(74) *Attorney, Agent, or Firm* — JCIPRNET

(57) ABSTRACT

A projector includes a light source, an optical element, a wheel-type optical assembly, a light valve, and a projection lens. The wheel-type optical assembly includes a frame, a driving unit, a rotating wheel, an optical sensing element, and a light shielding structure. The driving unit is arranged on the frame and connected to the rotating wheel. The driving unit drives the rotating wheel to rotate about a rotation axis. The optical sensing element arranged on the frame senses a rotation speed of the rotating wheel. The light shielding structure connected to the frame surrounds the optical sensing element. An orthographic projection of the light shielding structure on a reference plane partially overlaps an orthographic projection of the rotation axis on the reference plane. A normal line of the reference plane is parallel to a shortest connection line between an optical axis of the optical element and the rotation axis.

18 Claims, 5 Drawing Sheets

PROJECTOR AND WHEEL-TYPE OPTICAL ASSEMBLY

CROSS-REFERENCE TO RELATED APPLICATION

This application claims the priority benefit of U.S. provisional application Ser. No. 62/915,650, filed on Oct. 16, 2019, and China application serial no. 202021345744.4, filed on Jul. 10, 2020. The entirety of each of the above-mentioned patent applications is hereby incorporated by reference herein and made a part of this specification.

BACKGROUND

Technical Field

The disclosure relates to a display device and an optical assembly, and particularly relates to a projector and a wheel-type optical assembly.

Description of Related Art

Projectors are display devices used to produce large-size images. An imaging principle of a projector is to convert an illumination light beam generated by a light source into an image light beam through a light valve and then project the image light beam onto a screen or a wall through a projection lens.

Generally, the illumination light beam coming from the light source is excited by a phosphor wheel and/or filtered by a color filter wheel to become light of various colors. In order to ensure synchronization among the light source, the phosphor wheel, the filter wheel, and the light valve, an optical sensing element may be used to sense whether rotation speeds of the phosphor wheel and/or the filter wheel meet expectations. However, if a wavelength range of the illumination light beam emitted by the light source is similar to a wavelength range of a sensing light beam of the optical sensing element, diffusion of the illumination light beam in the projector may easily cause interference to the optical sensing element, which decreases sensing accuracy of the optical sensing element.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

The disclosure is directed to a projector and a wheel-type optical assembly capable of improving sensing accuracy of an optical sensing element.

Other objects and advantages of the disclosure may be further illustrated by the technical features broadly embodied and described as follows.

In order to achieve one or a portion of or all of the objects or other objects, an embodiment of the disclosure provides a projector including a light source, an optical element, a wheel-type optical assembly, a light valve, and a projection lens. The light source is configured to provide an illumination light beam. The optical element is arranged on a transmission path of the illumination light beam. The wheel-type optical assembly includes a frame, a driving unit, a rotating wheel, an optical sensing element, and a light shielding structure. The driving unit is arranged on the frame. The rotating wheel is connected to the driving unit and located on the transmission path of the illumination light beam, and the driving unit is configured to drive the rotating wheel to rotate about a rotation axis. The optical sensing element is arranged on the frame and configured to sense a rotation speed of the rotating wheel. The light shielding structure is connected to the frame and surrounds the optical sensing element. An orthographic projection of the light shielding structure on a reference plane is partially overlapped with an orthographic projection of the rotation axis on the reference plane, and a normal line of the reference plane is parallel to a shortest connection line between an optical axis of the optical element and the rotation axis. The light valve is arranged on the transmission path of the illumination light beam and configured to convert the illumination light beam into an image light beam. The projection lens is arranged on a transmission path of the image light beam and configured to project out the image light beam.

In order to achieve one or a portion of or all of the objects or other objects, an embodiment of the disclosure provides a wheel-type optical assembly including a frame, a rotating wheel, a driving unit, an optical sensing element, and a light shielding structure. The rotating wheel is disposed on the frame and located on a transmission path of an illumination light beam. The driving unit is connected to the rotating wheel and configured to drive the rotating wheel to rotate about a rotation axis. The optical sensing element is arranged on the frame and configured to sense a rotation speed of the rotating wheel. The light shielding structure is connected to the frame and surrounds the optical sensing element. An orthographic projection of the light shielding structure on a reference plane is partially overlapped with an orthographic projection of the rotation axis on the reference plane, and a normal line of the reference plane is parallel to a shortest connection line between an optical axis of the optical element and the rotation axis. The optical element is located on the transmission path of the illumination light beam.

Based on the above description, in the disclosure, the optical sensing element is shielded by the light shielding structure extending from the frame, and the light shielding structure extends between the optical element and the optical sensing element. In this way, diffused light coming from the optical element is prevented from being transmitted towards the optical sensing element, and that sensing accuracy of the optical sensing element is therefore improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
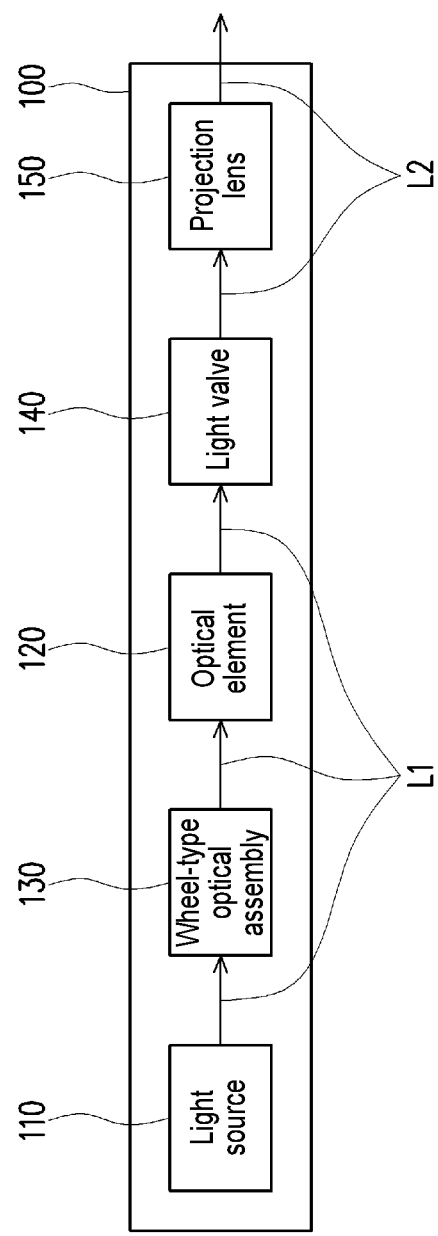
FIG. 1 is a schematic view of a projector according to an embodiment of the disclosure.

FIG. 1 is a schematic view of a projector 100 according to an embodiment of the disclosure. Referring to FIG. 1, the projector 100 of the embodiment includes a light source 110, an optical element 120, a wheel-type optical assembly 130, a light valve 140, and a projection lens 150. The light source 110 is configured to provide an illumination light beam L1. The optical element 120, the wheel-type optical assembly 130, and the light valve 140 are arranged on a transmission path of the illumination light beam L1. The light valve 140 is configured to convert the illumination light beam L1 into an image light beam L2. The projection lens 150 is arranged on a transmission path of the image light beam L2 and is configured to project out the image light beam L2.

In the embodiment, the optical element 120 is, for example, a light homogenizing element (such as an integrating rod), the wheel-type optical assembly 130 is, for example, a filter wheel assembly. The light valve 140 is, for example, a digital micro-mirror device (DMD) or a liquid crystal on silicon (LCoS) or a liquid crystal display (LCD) panel. In other embodiments, the wheel-type optical assembly 130 may be a phosphor wheel assembly, and the optical element 120 may be a lens located adjacent to the phosphor wheel assembly, which is not limited by the disclosure.

Figure 2:
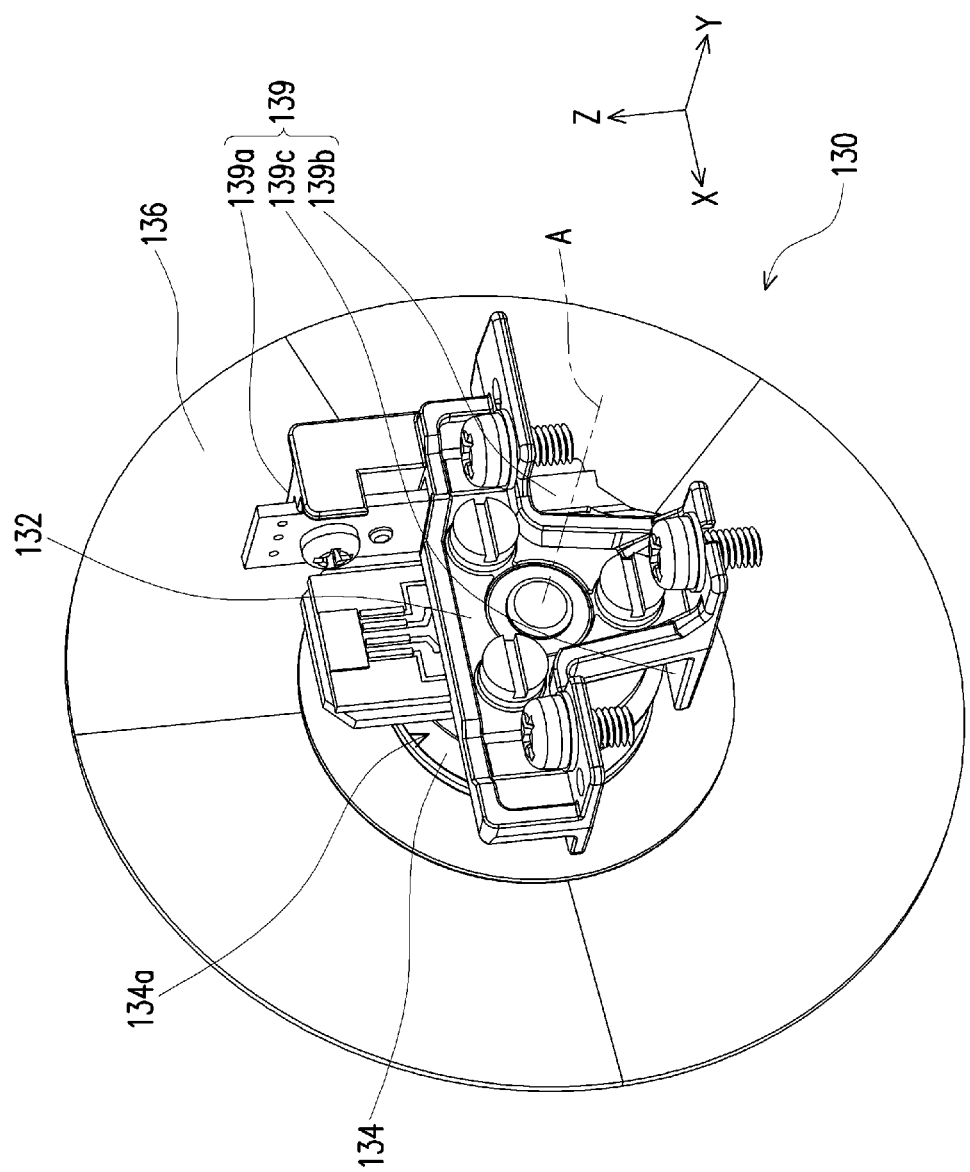
FIG. 2 is a three-dimensional view of a wheel-type optical assembly of FIG. 1.
Figure 3:
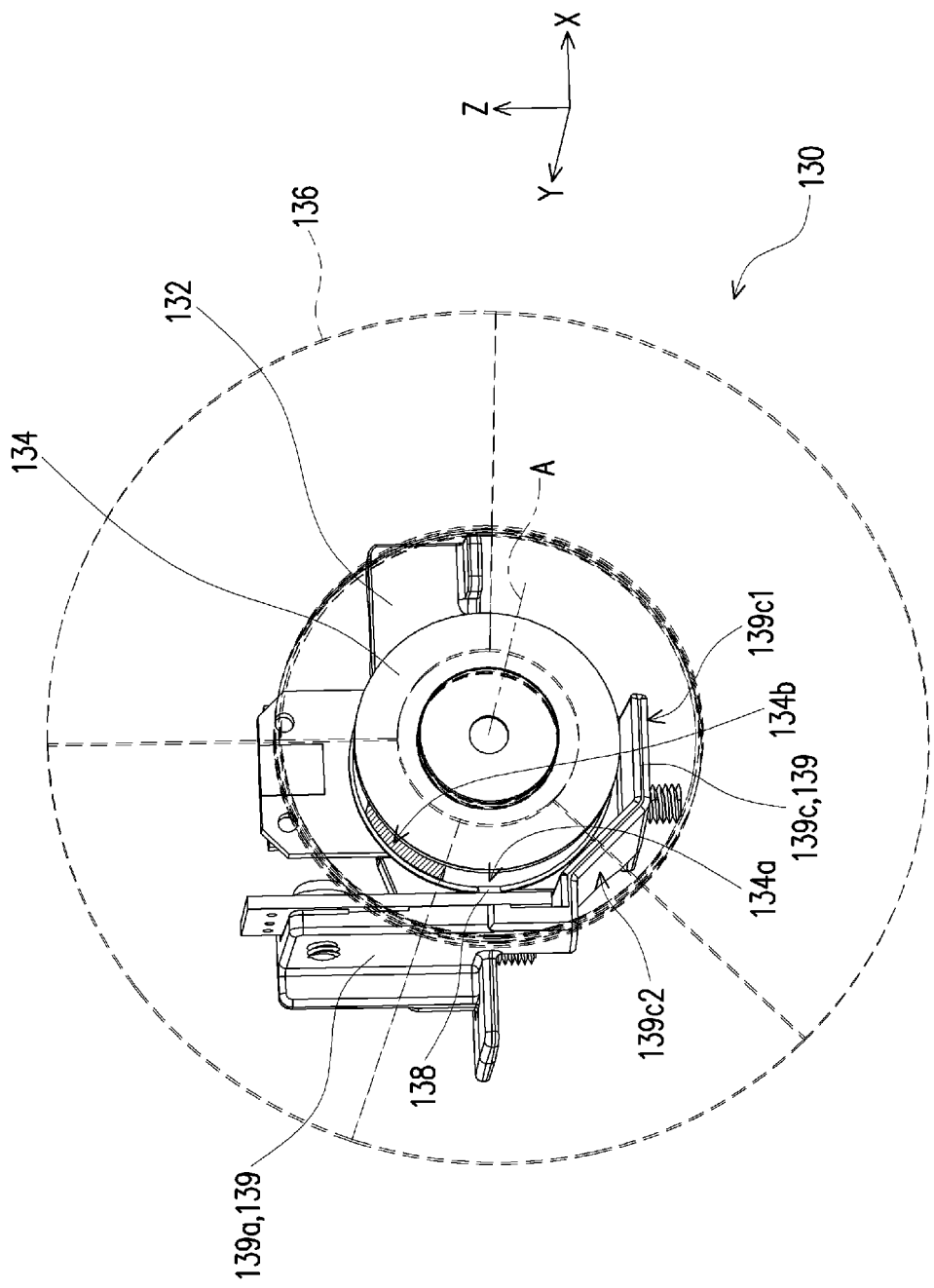
FIG. 3 is a three-dimensional view of the wheel-type optical assembly of FIG. 2 in another viewing angle.

FIG. 2 is a three-dimensional view of the wheel-type optical assembly 130 of FIG. 1. FIG. 3 is a three-dimensional view of the wheel-type optical assembly 130 of FIG. 2 in another viewing angle. Referring to FIG. 2 and FIG. 3, the wheel-type optical assembly 130 of the embodiment includes a frame 132, a driving unit 134, a rotating wheel 136, and an optical sensing element 138. The driving unit 134 is, for example, a motor and is arranged on the frame 132. The rotating wheel 136 is, for example, a filter wheel or a phosphor wheel, is connected to the driving unit 134, and is located on the transmission path of the illumination light beam L1 (shown in FIG. 1).

The driving unit 134 is configured to drive the rotating wheel 136 to rotate about a rotation axis A, such that a plurality of different regions of the rotating wheel 136 are sequentially moved to the transmission path of the illumination light beam L1. The plurality of different regions may be a plurality of different filter regions of the filter wheel or a plurality of different light excitation regions of the phosphor wheel. The optical sensing element 138 is arranged on the frame 132 and is configured to sense whether a rotation speed of the rotating wheel 136 meets expectation to ensure synchronization of the light source 110 (shown in FIG. 1), the rotating wheel 136, and the light valve 140 (shown in FIG. 1). To be specific, the optical sensing element 138 may emit a sensing light beam to the driving unit 134 through a light-emitting unit, and the sensing light beam irradiates a reflective region 134a of the driving unit 134 or a non-reflective region 134b of the driving unit 134 along with rotation of the driving unit 134. The sensing light beam irradiating the reflective region 134a is reflected back to the optical sensing element 138, and the sensing light beam irradiating the non-reflective region 134b is not reflected. A sensing unit of the optical sensing element 138 may accordingly sense the rotation speed of the driving unit 134. The reflective region 134a is, for example, a metal surface, and the non-reflective region 134b is, for example, a black coating to absorb light so that light may not be reflected.

The wheel-type optical assembly 130 of this embodiment further includes a light shielding structure 139. The light shielding structure 139 is, for example, integrally connected to the frame 132 and surrounds the optical sensing element 138 to prevent diffused light in the projector 100 (marked in FIG. 1) from interfering with the optical sensing element 138. To be specific, a wavelength range of the sensing light beam emitted by the optical sensing element 138 is, for example, approximately 700 nm to 1200 nm. The light source 110 (shown in FIG. 1) is, for example, an infrared light source, and the emitted illumination light beam L1 (marked in FIG. 1) is an infrared light beam. As such, the wavelength range of the sensing light beam and the wavelength range of the illumination light beam L1 are at least partially overlapped. Further, the rotating wheel 136 is, for example, light transmissive and is configured to allow the illumination light beam L1 to pass through to be transmitted towards the optical sensing element 138. In other words, the different regions of the rotating wheel 136, for example, include a transmissive region that allows the illumination light beam L1 to pass through. A material of the transmissive region may be a light-transmitting solid material, such as glass, or the transmissive region may be a hollow opening. The light shielding structure 139 may shield the illumination light beam L1 transmitted to the optical sensing element 138 to prevent the illumination light beam L1 from reaching the optical sensing element 138. A problem that the optical sensing element 138 misjudges the illumination light beam L1 as the sensing light beam can be thereby prevented.

Figure 4:
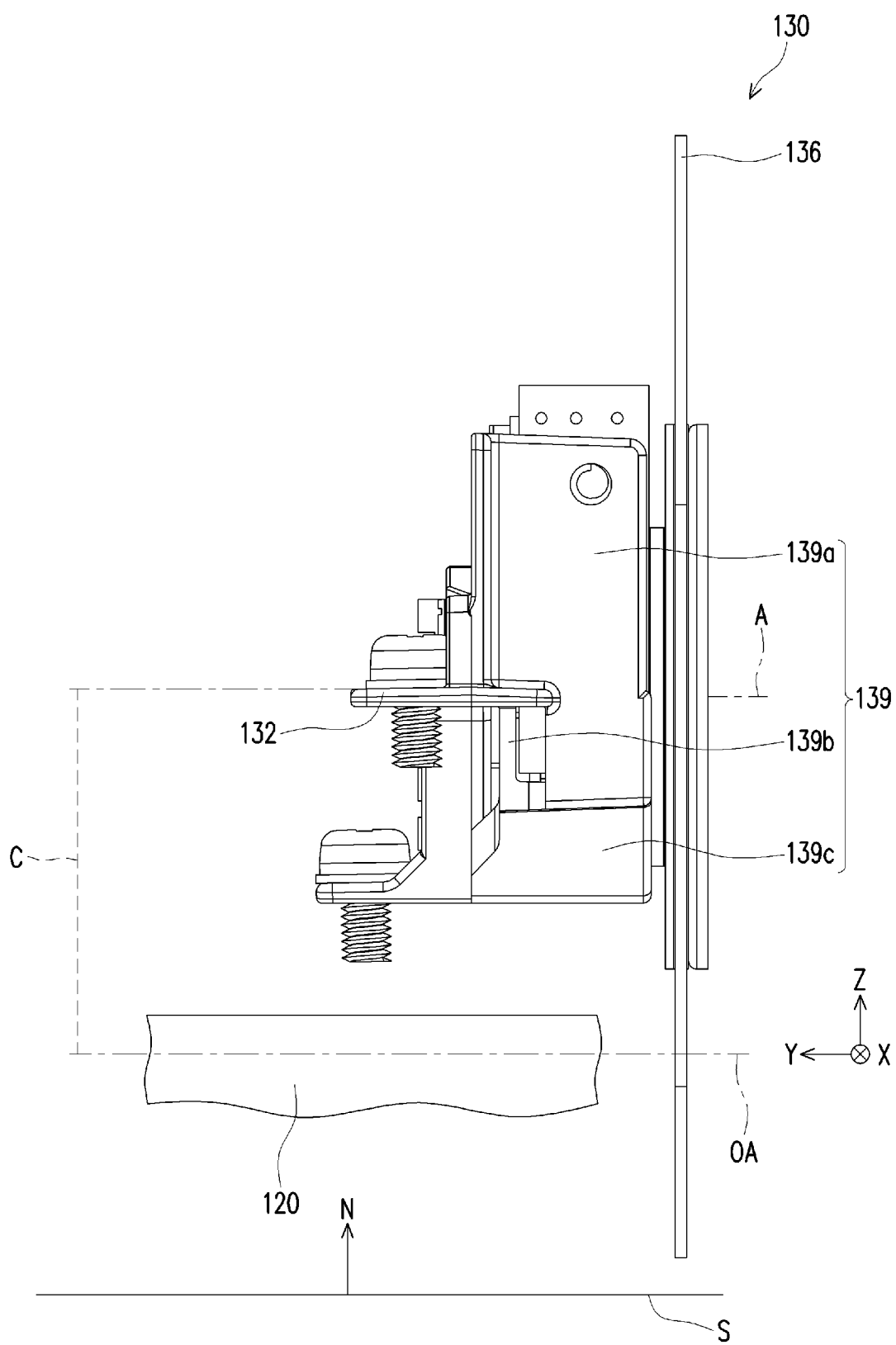
FIG. 4 is a side view of the wheel-type optical assembly and an optical element of FIG. 1.
Figure 5:
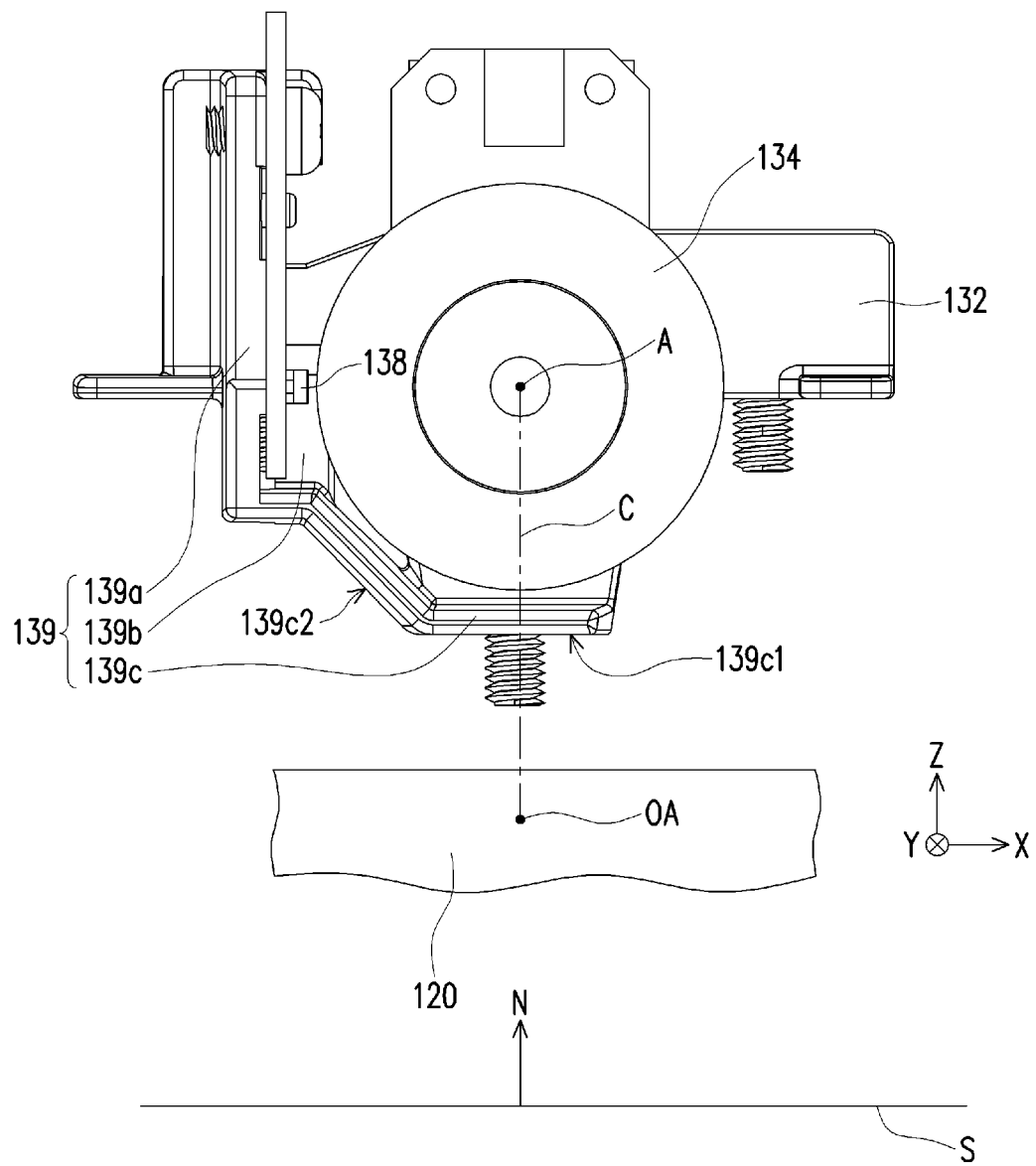
FIG. 5 is a partial back view of the wheel-type optical assembly and the optical element of FIG. 4.

FIG. 4 is a side view of the wheel-type optical assembly 130 and the optical element 120 of FIG. 1. FIG. 5 is a partial back view of the wheel-type optical assembly 130 and the optical element 120 of FIG. 4. Referring to FIG. 4 and FIG. 5, further, an orthographic projection of the light shielding structure 139 on a reference plane S is partially overlapped with an orthographic projection of the rotation axis A on the reference plane S, and a normal line N of the reference plane S is parallel to a shortest connection line C between an optical axis OA of the optical element 120 and the rotation axis A. In this way, the light shielding structure 139 extends between the optical element 120 and the driving unit 134. That is, at least a part of the light shielding structure 139 is located between the optical element 120 and the driving unit 134 and may prevent the diffused light coming from the optical element 120 from reaching the optical sensing element 138. Sensing accuracy of the optical sensing element 138 is thereby improved in this way.

The light shielding structure 139 of this embodiment may include a plurality of light shielding parts 139a, 139b, and 139c. The light shielding parts 139a, 139b, and 139c respectively shield the optical sensing element 138 in three different directions X, Y, and Z. The directions X, Y, and Z are, for example, perpendicular to each other. In other embodiments, the light shielding structure 139 may shield the optical sensing element 138 in more different directions, which is not limited by the disclosure. Moreover, in the embodiment, at least a part of a surface of the light shielding structure 139 may be set to black. In this way, the illumination light beam L1 is prevented from being reflected after irradiating the light shielding structure 139, so as to further reduce a probability that the illumination light beam L1 is transmitted to the optical sensing element 138. For example, surfaces 139c1 and 139c2 (marked in FIG. 3 and FIG. 5) of the light shielding structure 139 facing the optical element 120 may be set to black.

In view of the foregoing, in the disclosure, the optical sensing element is shielded by the light shielding structure extending from the frame, and the light shielding structure extends between the optical element and the optical sensing element. In this way, diffused light coming from the optical element is prevented from being transmitted towards the optical sensing element, and that sensing accuracy of the optical sensing element is thereby improved. Moreover, the light shielding structure may shield the optical sensing element in at least three different directions, so as to more comprehensively block the diffused light from being transmitted towards the optical sensing element.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projector, comprising a light source, an optical element, a wheel-type optical assembly, a light valve, and a projection lens, wherein
    the light source is configured to provide an illumination light beam,
    the optical element is arranged on a transmission path of the illumination light beam,
    the wheel-type optical assembly comprises a frame, a driving unit, a rotating wheel, an optical sensing element, and a light shielding structure, wherein
        the driving unit is arranged on the frame,
        the rotating wheel is connected to the driving unit and located on the transmission path of the illumination light beam, and the driving unit is configured to drive the rotating wheel to rotate about a rotation axis,
        the optical sensing element is arranged on the frame and configured to sense a rotation speed of the rotating wheel, and
        the light shielding structure is connected to the frame and surrounds the optical sensing element, wherein an orthographic projection of the light shielding structure on a reference plane is partially overlapped with an orthographic projection of the rotation axis on the reference plane, and a normal line of the reference plane is parallel to a shortest connection line between an optical axis of the optical element and the rotation axis, wherein at least part of the light shielding structure is located between the optical element and the driving unit, and the shortest connection line between the optical axis of the optical element and the rotation axis passes through the at least part of the light shielding structure, the light valve is arranged on the transmission path of the illumination light beam and configured to convert the illumination light beam into an image light beam, and the projection lens is arranged on a transmission path of the image light beam and configured to project out the image light beam.

2. The projector according to claim 1, wherein the optical element is a light homogenizing element.

3. The projector according to claim 1, wherein the rotating wheel is a phosphor wheel or a filter wheel.

4. The projector according to claim 1, wherein the light shielding structure is integrally connected to the frame.

5. The projector according to claim 1, wherein at least a part of a surface of the light shielding structure is black.

6. The projector according to claim 1, wherein the rotating wheel is light transmissive and is configured to allow the illumination light beam to pass through.

7. The projector according to claim 1, wherein the light shielding structure shields the optical sensing element in at least three different directions.

8. The projector according to claim 1, wherein the light source is an infrared light source, and the illumination light beam is an infrared light beam.

9. The projector according to claim 1, wherein the optical sensing element is configured to emit a sensing light beam, and a wavelength range of the sensing light beam is at least partially overlapped with a wavelength range of the illumination light beam.

10. A wheel-type optical assembly, comprising a frame, a rotating wheel, a driving unit, an optical sensing element, and a light shielding structure, wherein:

the rotating wheel is disposed on the frame and located on a transmission path of an illumination light beam, the driving unit is connected to the rotating wheel and configured to drive the rotating wheel to rotate about a rotation axis, the optical sensing element is arranged on the frame and configured to sense a rotation speed of the rotating wheel, and the light shielding structure is connected to the frame and surrounds the optical sensing element, wherein an orthographic projection of the light shielding structure on a reference plane is partially overlapped with an orthographic projection of the rotation axis on the reference plane, a normal line of the reference plane is parallel to a shortest connection line between an optical axis of the optical element and the rotation axis, and the optical element is located on the transmission path of the illumination light beam, wherein at least part of the light shielding structure is located between the optical element and the driving unit, and the shortest connection line between the optical axis of the optical element and the rotation axis passes through the at least part of the light shielding structure.

11. The wheel-type optical assembly according to claim 10, wherein the optical element is a light homogenizing element.

12. The wheel-type optical assembly according to claim 10, wherein the rotating wheel is a phosphor wheel or a filter wheel.

13. The wheel-type optical assembly according to claim 10, wherein the light shielding structure is integrally connected to the frame.

14. The wheel-type optical assembly according to claim 10, wherein at least a part of a surface of the light shielding structure is black.

15. The wheel-type optical assembly according to claim 10, wherein the rotating wheel is light transmissive and is configured to allow the illumination light beam to pass through.

16. The wheel-type optical assembly according to claim 10, wherein the light shielding structure shields the optical sensing element in at least three different directions.

17. The wheel-type optical assembly according to claim 10, wherein the illumination light beam is an infrared light beam.

18. The wheel-type optical assembly according to claim 10, wherein the optical sensing element is configured to emit a sensing light beam, and a wavelength range of the sensing light beam is at least partially overlapped with a wavelength range of the illumination light beam.

* * * * *